United States Patent [19]

Müller et al.

[11] 4,405,187

[45] Sep. 20, 1983

[54] CONNECTOR ASSEMBLY FOR PCM CABLES

[75] Inventors: Manfred Müller; Klaus-Peter Achtnig, both of Berlin, Fed. Rep. of Germany

[73] Assignee: Krone GmbH, Berlin, Fed. Rep. of Germany

[21] Appl. No.: 246,248

[22] Filed: Mar. 23, 1981

[30] Foreign Application Priority Data

Jun. 6, 1980 [DE] Fed. Rep. of Germany ....... 3021283

[51] Int. Cl.³ ......................................... H01R 13/512
[52] U.S. Cl. ............................. 339/14 R; 339/143 R
[58] Field of Search ................. 339/14 R, 14 C, 14 P, 339/143 R, 143 C, 136 R

[56] References Cited

U.S. PATENT DOCUMENTS

| 2,876,274 | 3/1959 | Cole et al. ............... 339/143 R UX |
| 3,927,925 | 12/1975 | Borsuk ................... 339/14 P |
| 4,281,885 | 8/1981 | Forberg et al. .............. 339/14 R |

FOREIGN PATENT DOCUMENTS

| 334446 | 1/1977 | Austria . |
| 1181768 | 7/1965 | Fed. Rep. of Germany . |
| 1911312 | 2/1972 | Fed. Rep. of Germany . |
| 2242695 | 3/1974 | Fed. Rep. of Germany . |
| 2638155 | 3/1978 | Fed. Rep. of Germany . |
| 2021332 | 11/1979 | United Kingdom . |

Primary Examiner—Howard N. Goldberg
Attorney, Agent, or Firm—Brown & Martin

[57] ABSTRACT

The invention relates to a connector assembly for cables adapted to transmit signals with pulse-code modulation. The connector assembly may be used with an increased number of twin conductors either as a simple connector strip or as a pressure sealed cable termination device in conjunction with a housing member. The assembly offers sufficient electrical shielding and is of small size. To this end the connector assembly comprises a base plate (1) mounting a plurality of metal-shielded plastic housings (20). Each of the plastic housings (20) accommodates a pair of contact pins (24,24') secured in the base plate (1) in a pressure sealed and elecrically insulated manner for a twin conductor or, respectively, an individual cable, and further accommodates solderless, screwless and stripless PLUS-contact elements (13, 14, 15) electrically connected to the contact pins. At the lower surface of the base plate (1) there is provided a shielding (3) for the contact pins (24, 24') and the cable conductors (9a) fixedly connected thereto, the shielding (3) being formed of a plurality of electrically conductive partition walls (3b).

13 Claims, 4 Drawing Figures

CONNECTOR ASSEMBLY FOR PCM CABLES

The present invention relates to a connector assembly for cables adapted for signal transmission with pulse-code modulation (briefly called PCM cables).

It has been common practice to provide large capacity cable dividing boxes with smaller sized PCM cables. Typically a PCM cable having only 6 twin conductors is connected to a cable dividing box intended for 12 twin conductors. This is necessary to ensure the electrical values required for shielding. This known structure suffers from the disadvantage of large space requirement and high costs.

It is the object of the present invention to provide a connector assembly for PCM cables having e.g. 10 twin conductors, which assembly is suitable e.g. for the 30-channel and the 120-channel system and which may be used both as a pressure sealed cable termination device or, when housing portions are omitted, as a simple connector strip.

In accordance with the present invention the above-specified object is solved in that a plurality of metal-shielded plastic housings are mounted on a base plate, each plastic housing accommodating a pair of contact pins mounted in the base plate in a pressure sealed and insulated manner as well as contact elements electrically connected to the contact pins. The lower surface of the base plate is provided with a metal shielding formed of a plurality of partitions and adapted to receive said contact pins and the cable conductors connected thereto.

The desired high shielding values are achieved by the provision of separate plastic housings and by the shielding which consists of a corresponding number of partitions dividing the space beneath the base plate into chambers that open towards the cable end and correspond in number to the plastic housings.

The desired shielding values are still more improved by shield plates disposed in each of said plastic housings and connected to a common shield connector.

Further advantageous developments of the present invention will be apparent from the subclaims.

An embodiment of the invention will be described in detail with reference to the accompanying drawings, in which.

Figure 1:
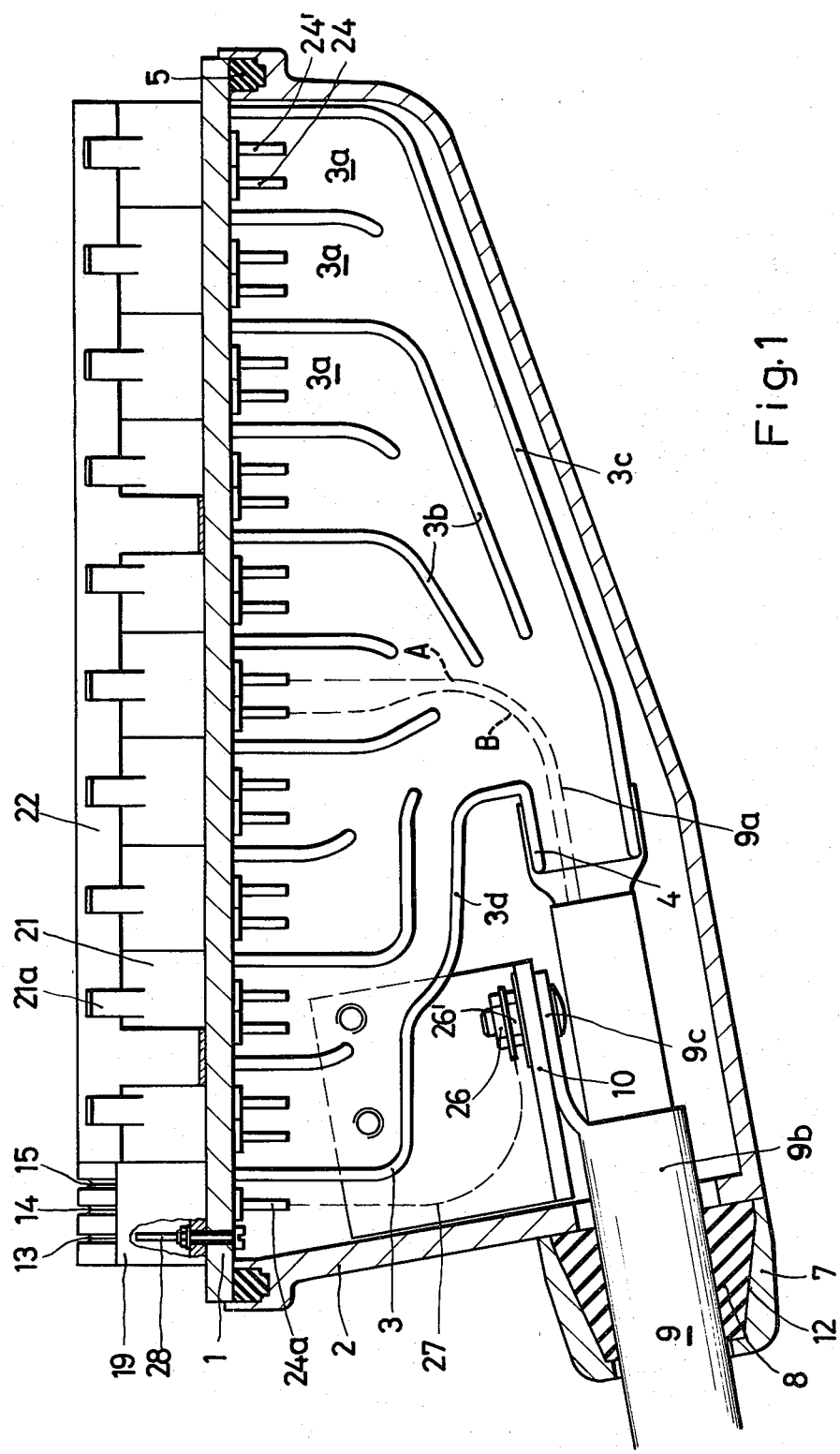
FIG. 1 is a longitudinal section of a connector assembly constructed as a pressure sealed cable termination device.

The cable termination device shown in the drawing comprises a rectangular base plate 1 mounting a series of pairs of contact pins 24, 24', a series of metal-shielded plastic housings 20 on top of the base plate 1 in which housings the upper ends of the contact pins 24, 24' and electrical contact elements 13, 14, 15 are mounted, and a metallic shielding 3 mounted to the lower surface of the base plate 1.

The embodiment shown in the drawing includes a metal housing 2 attached to the rectangular base plate 1 by suitable means such as bolts 6, and receiving in a pressure sealed manner the shielding 3, said metal housing 2 being provided with a pressure sealed cable entry portion 7, 8 for introducing a PCM cable 9.

Figure 3:
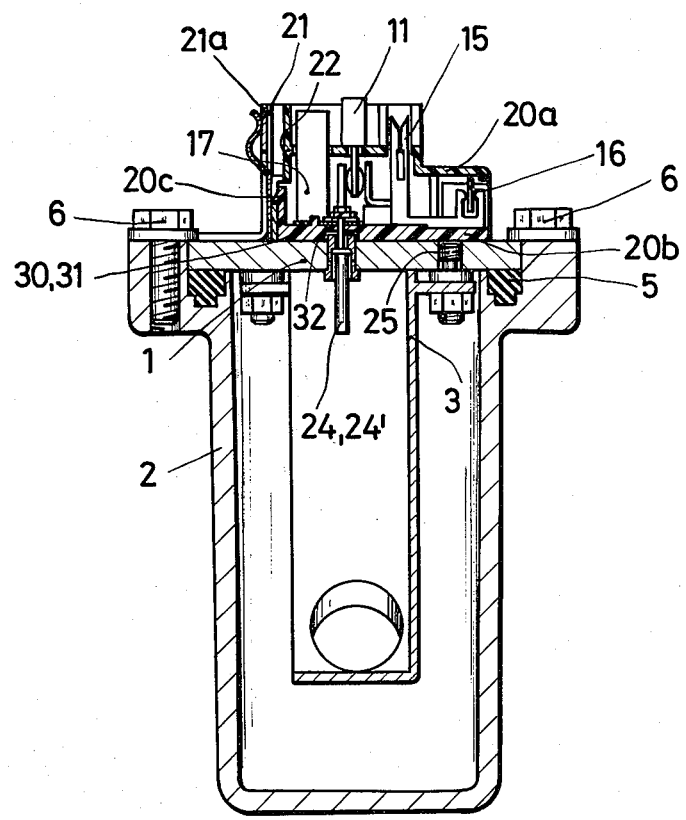
FIG. 3 is a cross-sectional view of the cable termination device shown in FIG. 1.

The metal shielding 3 includes a plurality of bent or deformed sheet-metal plates 3b, 3c, 3d which subdivide the space beneath the base plate 1 into chambers 3a corresponding in number to the pairs of contact pins 24, 24'. A pair of contact pins 24, 24' projects into each of said chambers 3a, and the conductors 9a of the individual PCM cables are secured to said contact pins e.g. by soldering. The individual plates 3b to 3d of the metal shielding 3 are conductively connected by means of bolts 25 to the base plate 1 (FIG. 3). The two outermost plates 3c and 3d of the shielding 3 terminate in a common sleeve-like member 4 onto which the shielding tape of the PCM cable 9 is secured by means of a hose clamp (not shown) and through the interior of which the twin conductors 9a of the individual cables are inserted.

In the embodiment of a cable termination device as shown the PCM cable 9 enters the metal housing 2 through an end wall. To seal the PCM cable 9 with respect to the housing interior a cover 7 is mounted to the outside of the housing wall, which cover has a conical inner wall 12 filled with a sealing compound 8 firmly enclosing the cable 9. To relieve tensile forces applied to the PCM cable 9 the cable jacket 9b is secured through a tab 9c by means of a bolt to a bracket 10 mounted on a sidewall of the shielding 3. An electrical conductor 27 is clamped between two nuts 26, 26' of the fastening bolt, and this conductor 27 is connected to an additional contact pin 24a mounted in the base plate 1 so as to provide an electrical connection between the aluminium jacket 9b of the PCM cable 9 and the contact members 13, 14, 15 disposed above the contact pin 24a in an additional plastic housing 19 mounted on the base plate 1.

The contact pins 24, 24', 24a are provided with a threaded portion and in addition to their function as electrical conducting members they serve to secure the individual plastic housings 19, 20 to the base plate 1 by means of nuts 32 threaded thereon (FIG. 3).

Figure 2:
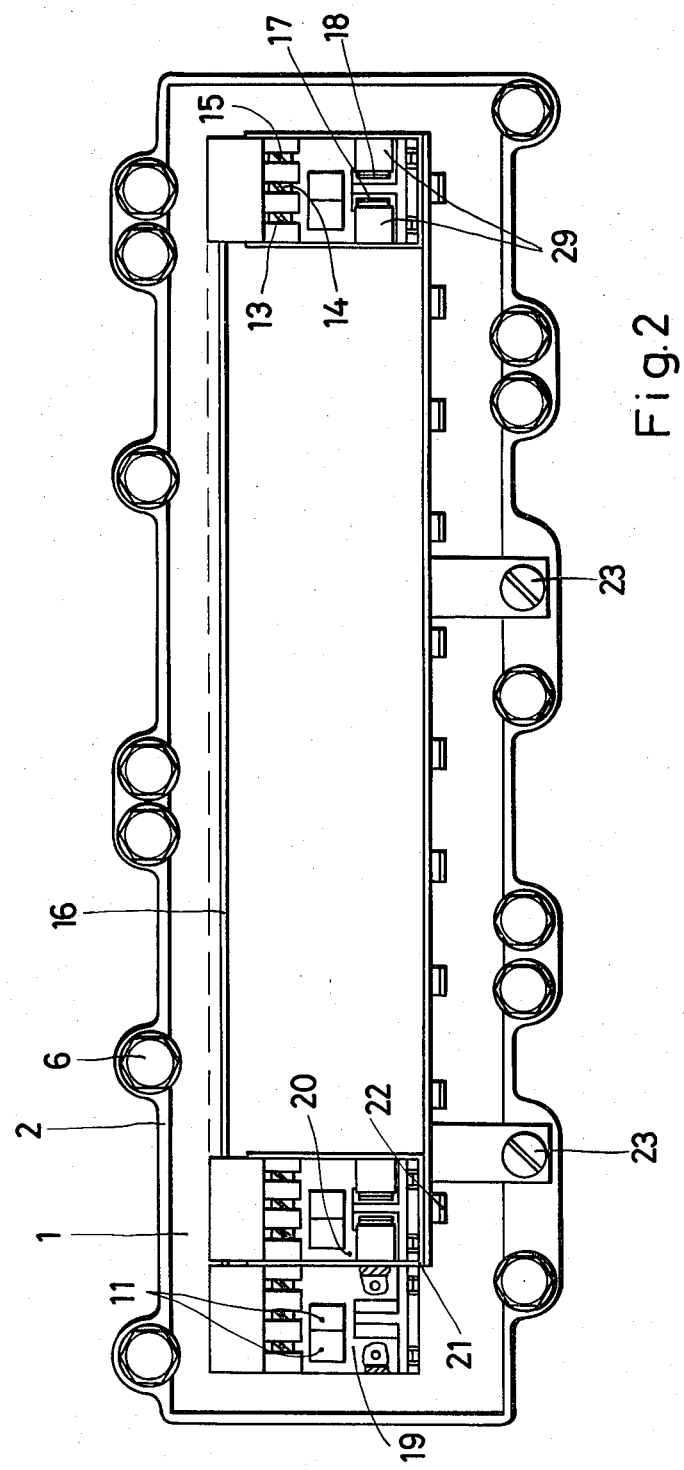
FIG. 2 is a plan view of the cable termination device shown in FIG. 1.
Figure 4:
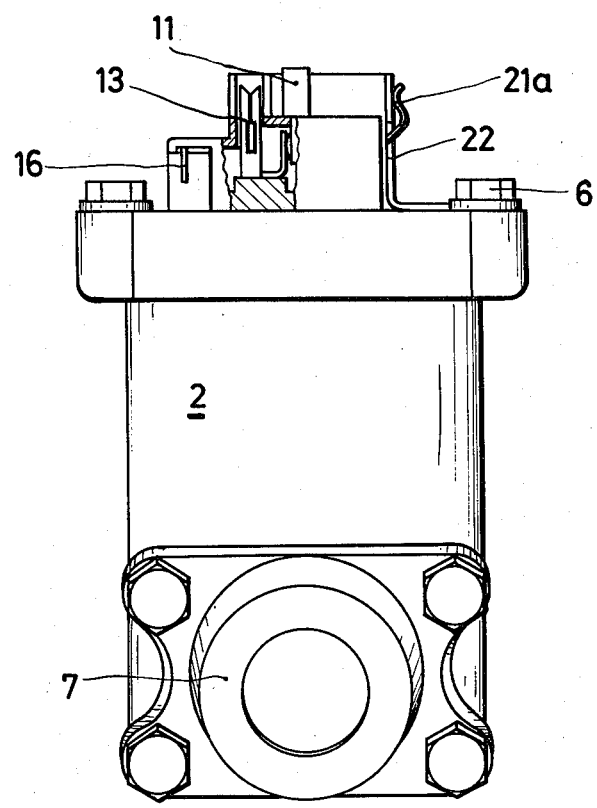
FIG. 4 is a front view, partially in section, of the cable termination device shown in FIG. 1.

As will be apparent from FIG. 2 each of the plastic housings 20, which consists of an upper section 20a and a lower section 20b, is surrounded by a thin shield plate 21, e.g. of copper, engaging beneath the respective upper housing section 20a and being thus fixed thereto. The shielding plates 21 are connected through clamp connections 21a to a common shielded connector 22 which is electrically conductively secured to the metal housing 2 by means of two bolts 23. The upper housing section 20a is fixed by means of hook-like projections 20c to the lower housing section 20b threaded to the base plate 1 (FIGS. 1 and 4).

The electrical contact elements 13, 14, 15 disposed in each of said plastic housings 20 are solderless, screwless and stripless PLUS-contact elements. The term PLUS is known in the art as referring to a type of contact being adapted to connect to a wire conductor in a particular manner, and specifically concerns solderless, screwless and stripless contacts. These special solderless, screwless and stripless contact elements enable electrical connections to be made between an insulated conductor wire and the contact element without prior removal of the insulation of said wire. To make such an electrical connection the respective end of the conductor wire is urged transversely into a slot formed between two upright resilient blades. Lateral cutting edges are formed on the blades which upon urging of the length of wire into the slot sever the insulation and provide for a positive contact with the conductive material.

The A- and B-wires are connected to the two solderless, screwless and stripless PLUS-contact elements 13, 14 shown in FIG. 2, and the supplementary earth wire of an outgoing cable is connected to the contact element 15. The A- and B-wires of incoming cable 9a are shown in FIG. 1. Outgoing cables (not shown) to which LSA contacts 13, 14 are adapted to connect, have equivalent A- and B-wires as well as a ground to connect to contact 15. The electrical connection between the contact pins 24, 24' and the solderless, screwless and stripless PLUS-contact elements 13, 14 is made by a respective connecting plug 11 fixed in a transverse wall in the upper housing section 20a. The solderless, screwless and stripless PLUS-contact elements 15 of the supplementary earth wires, by means of angularly offset webs formed at their lower ends, are insulatedly led through the shielding plates 21 of the respective plastic housings and are connected via a common earth bar 16 to the contact element in the additional plastic housing 19 having no shielding. By means of a further connecting plug 11 it is possible to electrically connect the supplementary earth wires and, respectively, the earth bar 16 to a pin 28 mounted in the base plate 1 and, respectively, in the metal housing 2, which pin is the only one in the additional plastic housing 19 to be conductively connected to the base plate 1.

To protect the A- and B-wires of the incoming cables 9a the plastic housings 20 are provided with arresters 29 firmly inserted between the respective shielding plate 21 and plate springs 17, 18. The effective spring leaf of each plate spring 17, 18 extends in an upright manner within the respective plastic housing 20, and an angularly offset lower portion of each spring is fixed via the nut 32 to the respective contact pin 24, 24'. Bosses 30, 31 integrally formed at the bottom of the lower housing section 20b serve to locate the plate springs 17, 18 (FIG. 3).

As has been set out the connector assembly described above constitutes a pressure sealed cable termination device. Depending on the site and purpose of use, the metal housing 2 mounted to the base plate 1 by means of a plastically deformed sealing means 5 may be omitted so that then the connector assembly may be used as a simple connector strip. This possibility of selective utilization constitutes an essential advantage of the present invention.

What is claimed is:

1. A connector assembly for pulse-code modulation cables, said connector assembly being electrically shielded, said assembly comprising:
    a generally rectangular electrically conductive base plate having top and bottom surfaces;
    a plurality of contact pin pairs extending through said base plate and having top and bottom ends, said contact pins being mounted to said base plate in a pressure sealed and electrically insulated manner;
    a like plurality of electrically insulative housings mounted to said top of said base plate and accommodating one of said contact pin pairs;
    metal shielding means on each said insulative housing;
    a plurality of contact elements in each said housing;
    means in each said housing to couple said contact elements individually with the top ends of said contact pins;
    metal shielding means extending generally downwardly from the bottom of said base plate in the form of a plurality of partitions forming chambers in each of which reside the bottom ends of one of said contact pin pairs; and
    means adapted to receive said cable so that pairs of conductors from said cable are connectable to the bottom ends of said contact pin pairs.

2. The connector assembly recited in claim 1 and further comprising:
    a metal housing;
    means to mount said metal housing to the bottom of said base plate in a pressure sealed manner to thereby enclose said metal shielding means and the bottom ends of said contact pin pairs; and
    cable entry means adapted to receive said cable in a pressure sealed manner.

3. The connector assembly recited in claim 2 wherein each said insulative housing further comprises:
    plate spring means; and
    arrestor means;
    said plate spring means being connected to said contact pins and supporting said arrestor means in said insulative housing;
    said coupling means in each said insulative housing comprises a connecting plug;
    said contact elements being solderless, screwless and stripless PLUS-contact elements adapted to connect the individual wires of outgoing cables.

4. The connector assembly recited in claim 2 wherein:
    each said insulative housing comprises an upper section and a lower section, said upper section being attached to said lower section by hook-shaped detents;
    said lower section being mounted to said base plate by means of a nut threaded to the top ends of said contact pins.

5. The connector assembly recited in claim 2 wherein:
    said insulative housing metal shielding means comprise shielding plates, said assembly further comprising:
    a shielding connector mounted to said metal housing; and
    means to electrically connect said shielding connector to said shielding plates.

6. The connector assembly recited in claim 2 wherein said cable entry means comprises a cover having a conical inner wall and a sealing compound disposed between said cover and said cable wall when a cable is inserted therein.

7. The connector assembly recited in claim 2 and further comprising:
    an angular bracket secured to said downwardly extending metal shielding means, said cable normally having a metal outer shield, and when inserted into said cable entry means said metal cable shield being secured to said angular bracket to provide relief from tensile forces;
    an additional unshielded insulative housing having a plurality of contact elements mounted therein; and
    means for electrically connecting said angular bracket to a contact pin extending into said additional housing.

8. The connector assembly recited in claim 2 wherein:
    said downwardly extending metal shielding means is formed of a plurality of bent plates forming said partitions and chambers;

the two outermost of said plates terminate in a common sleeve adapted to receive shielding tape around said cable when said cable is inserted into said assembly.

9. The connector assembly recited in claim 1 wherein each said insulative housing further comprises:
   plate spring means; and
   arrestor means;
   said plate spring means being connected to said contact pins and supporting said arrestor means in said insulative housing;
   said coupling means in each said insulative housing comprises a connecting plug;
   said contact elements being solderless, screwless and stripless PLUS-contact elements adapted to connect the individual wires of outgong cables.

10. The insulative housing recited in claim 1 wherein:
    each said insulative housing comprises an upper section and a lower section, said upper section being attached to said lower section by hook-shaped detents;
    said lower section being mounted to said base plate by means of a nut threaded to the top ends of said contact pins.

11. The connector assembly recited in claim 1 and further comprising:
    an additional unshielded insulative housing having a plurality of contact elements mounted therein; and
    an earth bar connected to one of said contact elements in each said housing and to a like contact element in said additional housing.

12. The connector assembly recited in claim 11 and further comprising:
    a ground contact pin mounted in said base plate for electrical connection thereto; and
    a connecting plug coupling said ground contact pin to said contact element which is in turn connected to said earth bar.

13. The connector assembly recited in claim 1 wherein:
    said downwardly extending metal shielding means is formed of a plurality of bent plates forming said partitions and chambers;
    the two outermost of said plates terminate in a common sleeve adapted to receive shielding tape around said cable when said cable is inserted into said assembly.

* * * * *